United States Patent [19]
Fujikawa et al.

[11] Patent Number: 5,241,387
[45] Date of Patent: Aug. 31, 1993

[54] NOISE-REDUCING FILTER APPARATUS FOR DECODED DIGITAL VIDEO SIGNAL

[75] Inventors: Wataru Fujikawa, Yokohama; Akiyoshi Tanaka, Kawasaki, both of Japan

[73] Assignee: Matsushita Electric Industrial Co., Ltd., Osaka, Japan

[21] Appl. No.: 799,266

[22] Filed: Nov. 27, 1991

[30] Foreign Application Priority Data

Nov. 28, 1990 [JP] Japan .................. 2-332410

[51] Int. Cl.⁵ .................... H04N 5/210; H04N 5/213
[52] U.S. Cl. ................................ 358/167; 358/36
[58] Field of Search .......... 358/167, 36, 166, 39, 358/37, 133, 141; 364/574

[56] References Cited

U.S. PATENT DOCUMENTS

| | | | |
|---|---|---|---|
| 3,715,477 | 2/1973 | Olson et al. | 358/36 |
| 4,520,396 | 5/1985 | Dischert et al. | 358/167 |
| 4,926,361 | 5/1990 | Ohtsubo et al. | 358/36 |
| 5,025,312 | 6/1991 | Faroudja | 358/36 |
| 5,119,195 | 6/1992 | Christopher | 358/167 |

FOREIGN PATENT DOCUMENTS 0256875 10/1989 Japan .
256179 2/1990 Japan .

*Primary Examiner*—James J. Groody
*Assistant Examiner*—Michael H. Lee
*Attorney, Agent, or Firm*—Lowe, Price, LeBlanc & Becker

[57] ABSTRACT

An encoding noise reduction filter is described which is applicable to a decoded video signal produced from a digital video signal encoding and decoding apparatus of a type in which variable values of quantization step size are utilized within each video signal frame and in which orthogonal transform coefficients for respective picture element values are quantized and encoded. Low-amplitude high-frequency components of the decoded video signal are eliminated to achieve encoding noise reduction, with high-frequency emphasis processing of the resultant signal then being applied, and with the operations for eliminating low-amplitude high-frequency components and executing high-frequency emphasis being respectively controlled in accordance with the picture quality of the frame that is currently being processed, as expressed by an average value of quantization step size that was used in encoding processing of the frame.

4 Claims, 3 Drawing Sheets

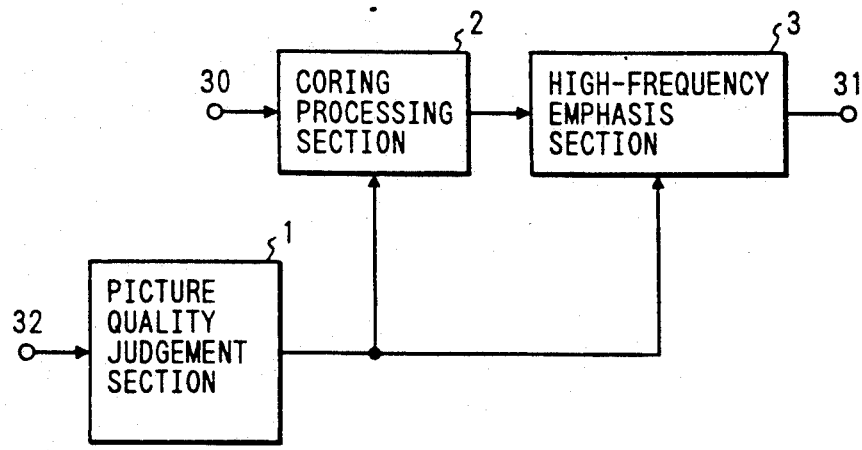
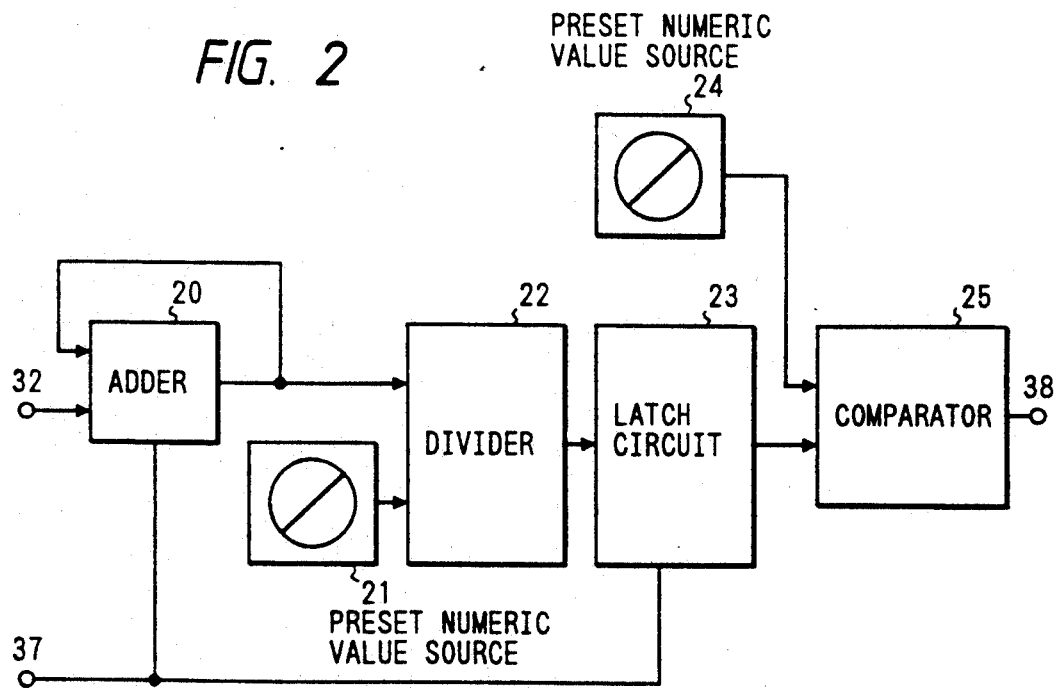

NOISE-REDUCING FILTER APPARATUS FOR DECODED DIGITAL VIDEO SIGNAL

BACKGROUND OF THE INVENTION

1. Field of the Invention

The present invention relates to an encoding noise reduction filter which is applicable to a decoded digital video signal obtained from a digital video signal encoding/decoding apparatus utilizing orthogonal transform processing.

2. Description of the Related Art

In recent years, as a result of advances that have been made in techniques for encoding of digital video signals, various types of apparatus have been proposed for processing a video signal to obtain an encoded video signal which can be transmitted or recorded as a data stream at a relatively low bit rate, e.g. for transmission or recording purposes, and for subsequently decoding the encoded video signal. In particular, methods have been proposed, for use with a moving-picture digital video signal encoding and decoding apparatus, whereby the quantization step size that is used in a quantization operation for the purpose of encoding the video signal is varied such as to maintain a constant bit rate for the encoded data. For example with an orthogonal transform type of encoding apparatus, the difference between each picture element luminance or chrominance value of the video signal and the corresponding value of the preceding frame of the video signal are mutually subtracted, and the resultant difference values are subjected to orthogonal transform processing (typically, Discrete Cosine Transform processing) to obtain respective transform coefficient values, which are quantized, with the quantization index values thus obtained being then encoded using a variable length encoding technique. The encoded data are then transferred through a buffer memory to be outputted as a bit stream, for transmission to a remote decoding apparatus, or for recording and subsequent decoding. Unless controlled, the rate of generation of encoded data will vary greatly between different frames, in accordance with the amount of activity occuring in the picture, i.e. if there are large differences between the contents of successive frames, then a large amount of encoded data will be generated for each frame. For that reason, the quantization step size may be controlled in accordance with the amount of data currently held in the buffer memory, in order to output the encoded data at a constant bit rate. Data which will be subsequently necessary for decoding purposes, including the quantization step size values, are also encoded and are transmitted to the decoding apparatus in the output bit stream from the encoding apparatus, multiplexed with the encoded data of the video signal.

Generally, each frame of the video signal is processed in the encoding apparatus as a set of 2-dimensional units of blocks of (picture element) values, with a specific value of quantization step size being determined for each block and used for all of that block., i.e. a fixed quantization step size is applied to the picture element data within each block. However the quantization step size can vary between successive blocks, in accordance with the state of the output buffer of the encoding apparatus as described above. Thus, successive values of quantization step size for respective blocks are outputted together with the code data corresponding to picture elements, in the bit stream produced from the encoding apparatus, to be used for dequantization processing in the decoding apparatus. The quantization step size can therefore vary within each frame of the video signal.

However with such a digital video signal encoding and decoding apparatus, when the quantization step size is large, a specific type of noise is produced in the display picture that is obtained from the decoded video signal. That noise is most conspicuous at the boundaries between different regions in picture conveyed by the video signal, and is conspicuous in the finally displayed picture. Such noise constitutes a significant problem.

Various types of encoding noise reduction methods have been proposed in the prior art for overcoming this problem. For example, such a video signal noise reduction method is described in Japanese Patent Laid-open No. 2-56179. With that method, basically, blurring of the picture expressed by the decoded video signal is produced by a filtering operation, with the filtering being selectively applied to picture elements which lie on the boundaries of picture regions which are visually uniform. More specifically, a decision as to whether or not filtering will be applied to a picture element (that is to say, applied to the luminance value of a picture element) is made in accordance with a judgement as to whether or not the picture element satisfies both of the following conditions (1) and (2):

(1) The picture element in question, which will be referred to as $P_a$, is disposed at a position in the picture such as to be affected by the noise which is generated at a boundary between different regions in the picture, as indicated by a position relationship between the boundary and the position of picture element $P_a$, obtained from information which expresses the boundary.

(2) The number n of picture elements $P_b$ which are disposed at the periphery of the picture element $P_a$ and which have a Laplacian value that is lower than a predetermined threshold value $TH_1$ is greater than a predetermined threshold value $TH_n$ (where the specific meaning of the term "Laplacian value" as used in such an application will be described in detail hereinafter).

The noise filtering is selectively applied to only these picture elements $P_a$ for which the above conditions are satisfied. A conventional type of smoothing filtering (i.e. spatial low-pass filtering) can be used, for example.

However with such a prior art technique, the problem arises that the method of judging those picture elements that are to be subjected to the smoothing filtering is complex, and requires large amounts of processing. Moreover, due to the fact that no parameter is used in that judgement which expresses the overall quality of the picture expressed by the digital video signal, it is difficult to control the filter operation in accordance with picture quality.

SUMMARY OF THE INVENTION

It is an objective of the present invention to overcome the disadvantages of the prior art as set out above, by providing an encoding noise reduction filter whereby it becomes unnecessary to execute complex processing, and whereby the encoding noise reduction is executed in accordance with the picture quality of the picture expressed by the decoded video signal, and moreover whereby an improvement in picture quality can be obtained when such an encoding noise reduction filter is applied to a moving-picture digital video signal encoding and decoding apparatus which utilizes orthogonal transform processing of inter-frame difference values and in which variable quantization step size values are utilized within each frame of the video signal during the encoding processing.

To achieve the above objectives the present invention provides an encoding noise reduction filter which is applicable to a decoded video signal produced from such a type of digital video signal encoding and decoding apparatus, comprising:

picture quality judgement means for judging, for each frame of the decoded video signal, a degree of picture quality of the frame based upon an average value of quantization step size used during the encoding processing for the frame;

coring processing means for eliminating high frequency components of the decoded video signal which are below a threshold value that is controlled by results obtained from the picture quality judgement means, to obtain a coring-processed video signal; and high frequency emphasis means for applying a degree of high frequency emphasis to each frame of the coring-processed video signal based on the results obtained from the picture quality judgement means.

Preferably, the high frequency emphasis means comprises:

Laplacian value calculation means for calculating, for each picture element of a frame of the coring-processed video signal, a Laplacian value based upon a value of the each picture element and respective values of a plurality of picture elements which are disposed closely adjacent to the each picture element within the frame;

compensation value calculation means for calculating, for the each picture element, a corresponding compensation value based upon the Laplacian value of the each picture element and a judgement result obtained for a frame containing the picture element, from the picture quality judgement means; and adder means for adding to each picture element value of the coring-processed video signal a corresponding compensation value.

As a result of such a configuration, the encoding noise that appears in a display picture obtained from the decoded video signal can be reduced, while blurring of the picture (as a result of the encoding noise reduction processing) is compensated by the high-frequency emphasis section. The operating characteristics of the coring processing section are controlled in accordance with the overall quality of the picture that is currently being expressed by the decoded video signal, as judged based upon an average value of quantization step size, taken over the entirety of the video signal frame that is currently being processed.

As a result, the encoding noise reduction processing is executed in accordance with picture quality, so that a substantially improved picture can be obtained from the decoded video signal.

BRIEF DESCRIPTION OF THE DRAWINGS

FIG.1 is a block diagram showing the general configuration of an embodiment of an encoding noise reduction filter according to the present invention;

FIG. 2 is a block diagram of a picture quality judgement section in the encoding noise reduction filter of FIG. 1.

DESCRIPTION OF PREFERRED EMBODIMENT

Figure 3:
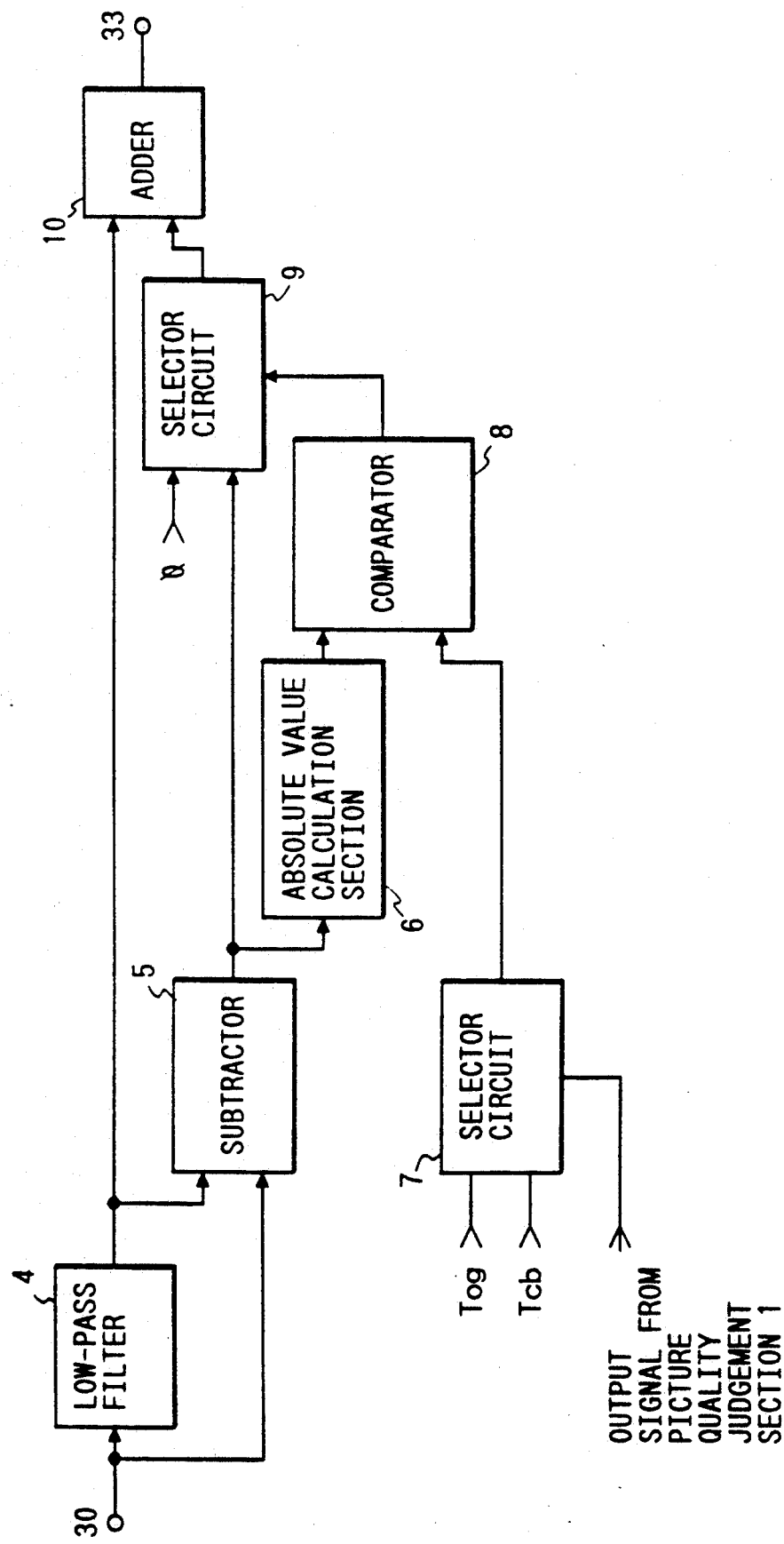
FIG. 3 is a block diagram of a coring processing section within the encoding noise reduction filter of FIG. 1.

FIG. 1 is a general block diagram of an embodiment of an encoding noise reduction filter according to the present invention. In FIG. 1, numeral 1 denotes a picture quality judgement section to which is supplied (from an input terminal 32) the respective quantization step size values of successive blocks of picture elements of a decoded video signal, these quantization step size values being supplied from a decoding apparatus (not shown in the drawings) which decodes a video signal that has been encoded by an orthogonal transform type of adaptive encoding apparatus as described hereinabove. The decoded video signal is inputted via an input terminal 30 to a coring processing section 2, which also receives as an input control signal an output signal which is produced from the picture quality judgement section 1.

In the case of a color video signal, this embodiment of the present invention operates only upon luminance values of the decoded video signal (although that is not a limiting feature of the invention). Hence in the case of a decoded color video signal, only the digital luminance values of the decoded video signal are supplied to the input terminal 30, and the resultant processed luminance values that are produced from the encoding noise reduction filter are then combined with the chrominance values of the decoded video signal. Hence in the following description of the embodiment, unless otherwise stated, the term "picture element value" or "value of the decoded video signal" signifies a luminance value.

A coring-processed video signal that is produced from the coring processing section 2 is inputted to a high frequency emphasis section 3, to which is also applied the output signal from the picture quality judgement section 1, as a control signal.

The basic operation of the circuit of FIG. 1 is as follows. The circuit can be considered to individually filter each of the successive frames of the decoded video signal. For each frame, the picture quality judgement section 1 calculates the average value of quantization step size over the entire frame (i.e. the average value of the respective quantization step size values that were applied to the blocks of that frame at the time of encoding), and compares that average value with a predetermined threshold value. The result of that comparison determines the state of a bi-state output signal that is produced from the picture quality judgement section 1, i.e. for each frame of the decoded video signal, that output signal takes one of two possible states which respectively indicate a high and a low value of quantization step size. With an adaptive encoding type of encoding/decoding apparatus which utilizes orthogonal transform processing such as the Discrete Cosine Transform, the smaller the quantization step size that is used, the lower will be the degree of distortion that is produced in the picture that is obtained from the decoded video signal. Hence, the average value of quantization step size that is used throughout a frame of the decoded video signal can be considered to represent a measure of picture quality of that frame, i.e. the two levels of the output signal from the picture quality judgement section 1 respectively indicate a relatively high level of picture quality (for the case of a small average value of quantization step size being obtained for a frame) and a relatively low level of picture quality (in the case of a large average value of quantization step size being obtained for the frame).

The coring processing section 2 receives the decoded video signal, separates the high spatial frequency components of that video signal from the low spatial frequency components, and converts to the value zero all of those picture element values contained in the high spatial frequency components which are below a predetermined threshold value. That threshold value will be designated as Tc. The resultant high spatial frequency components are then re-combined with the low-frequency components of the decoded video signal. That coring processing is executed in order to exclude the noise components, which are mainly concentrated in the low-amplitude high spatial frequency components of the video signal. The value of the threshold Tc is selected to be one of two possible levels, in accordance with the state of the aforementioned bi-state output signal that is produced from the picture quality judgement section 1.

The high frequency emphasis section 3 executes high frequency emphasis of the output signal produced from the coring processing section 2, by calculating for each picture element a value (referred to herein as a "Laplacian" value) based on respective values of the object picture element and a set of picture elements which are peripherally adjacent to the object picture element. The Laplacian value is proportional to the difference between the object picture element value and the average value of adjacent picture elements. In a border between two strongly contrasting regions of the picture, the high-frequency components of spatial frequency are large in amplitude. The Laplacian values of picture elements (if for example the elements are located on such a region boundary) thus provide an indication of the degree of contrast between the adjoining regions. Thus, based on the Laplacian values of respective picture elements, compensation can be applied for a loss of resolution which results from the processing executed in the coring processing section 2.

A more detailed description of the picture quality judgement section 1 will be given referring to FIG. 2, which is a block diagram showing the internal configuration of that section. The aforementioned respective quantization step size values of successive blocks of picture elements are supplied to the input terminal 32 from the decoding apparatus, while a reset signal (not shown in FIG. 1) is supplied to an input terminal 37. That reset signal is generated at the end of each frame interval of the decoded video signal, (i.e. can be derived from a frame synchronizing signal contained in the decoded video signal) within the decoding apparatus. The quantization step size values are supplied to one input of an adder 20, while the sum output signal from the adder 20 is fed back to a second input of the adder. The reset signal from input terminal 37 is applied to a reset control input terminal of the adder 20. The output numeric value from the adder 20 is supplied to one input of a divider 22, to be divided therein by a preset fixed numeric value which is supplied from a source 21 to the divider 22. The result of that division operation is supplied to a latch circuit 23, while the reset signal from input terminal 37 is supplied to a latching control input terminal of the latch circuit 23. The output value from the latch circuit 23 is supplied to one input of a comparator 25, while a preset fixed numeric value is supplied from a source 24 to the other input of the comparator 25. The output signal from the comparator 25 is supplied to an output terminal 38, and from there is supplied (as the aforementioned bi-state control signal from the picture quality judgement section 1) to the coring processing section 2 and high frequency emphasis section 3 as shown in FIG. 1.

The operation of the circuit of FIG. 2 is as follows. At the end of each frame interval of the decoded video signal, in response to the reset signal supplied from input terminal 37, the numeric value that is currently being outputted from the divider 22 is first latched into the latch circuit 23, than the adder 20 is reset to a count of zero. The adder 20 then begins to cumulatively sum the successive quantization step size values of the blocks of the succeeding frame, with the sum value being divided by the preset numeric value from source 21 in the divider 22. At the end of that frame interval, then assuming that the preset numeric value produced from the source 21 is identical to the total number of blocks in each frame for which respective quantization step size values are separately assigned during the encoding process, the output numeric value from the divider 22 is the average value of quantization step size which was utilized in quantizing the orthogonal transform coefficient values obtained for that frame at the time of encoding the video signal. That average value is then latched into the latch circuit 23, to be thereafter supplied to the comparator 25, and the adder 20 is then once more reset.

The fixed numeric value produced from the source 24 constitutes a comparison threshold value for the comparator 25, i.e. if the average value that is outputted from the latch circuit 23 for a frame is lower than that threshold value, then the output signal from the comparator 25 goes to a first level which indicates that the picture quality of that frame is relatively good (since, on average, a low value of quantization step size was used in the encoding processing for that frame) while if the output value from the latch circuit 23 for that frame is equal to or higher than the threshold value produced from the source 24, then the output signal from the comparator 25 goes to a second level which indicates that the picture quality of that frame is relatively poor.

A more detailed description of the coring processing section 2 will be given referring to FIG. 3, which is a block diagram showing the internal configuration of that section. In FIG. 3, numeral 4 denotes a low-pass filter to which is applied the decoded video signal from input terminal 30. The input and output signals of the low-pass filter 4 are mutually subtracted in a subtractor 5, and the resultant output signal is supplied to an absolute value calculation section 6 and also to a selector circuit 9. A selector circuit 7 receives as a control input signal the aforementioned bi-state output signal from the picture quality judgement section 1. A comparator 8 receives as input signals the output signals from the selector circuit 7 and the absolute value calculation section 6, to produce as output a control signal which is inputted to the selector circuit 9. A signal value of zero is fixedly supplied to the other input of the selector circuit 9. An output signal produced from the selector circuit 9 and the output signal from the low-pass filter 4 are respectively inputted to an adder 10, with the output signal of the coring processing section 2 being produced from the adder 10 and supplied via an output terminal 33 to the high frequency emphasis section 3.

The operation of the circuit of FIG. 3 is as follows. The low-pass filter 4 separates the low-frequency components of the decoded video signal, and supplies these low-frequency components to be subtracted from the video signal by the subtractor 5, to thereby obtain the high-frequency components of the video signal as the output signal from the subtractor 5. The selector circuit 7 selects (in accordance with the state of the picture quality indication output signal from the picture quality judgement section 1) one of two possible threshold values to be used in the coring processing, these threshold values being designated as Tcg (which is selected in the case of a frame having relatively good picture quality) and Tcb (which is selected in the case of a frame having relatively poor picture quality). The selected threshold value is supplied as one input to the comparator 8. For each picture element value contained in the high-frequency components of the decoded video signal, the corresponding absolute value is derived by the absolute value calculation section 6, and is supplied to the comparator 8 to be compared with the threshold value Tcg or Tcb. The result of that comparison constitutes a bi-state control signal which is applied to control the operation of the selector circuit 9. That is to say, if the absolute value of a picture element value that forms part of the high-frequency components of the decoded video signal is higher than the selected threshold value (Tcg or Tcb) then the selector circuit 9 is controlled such as to transfer that picture element value directly to the adder 10, without change. However if that absolute value is lower than the selected threshold value, then the selector circuit 9 outputs the value zero, to be supplied to the adder 10 in place of the picture element value having that absolute value. Thus, the selector circuit 9 produces as the output therefrom the coring-processed high-frequency components of the decoded video signal. These are then added to the low-frequency components of the decoded video signal (produced from the low-pass filter 4) in the adder 10, to thereby obtain the coring-processed video signal.

Figures 4, 5:
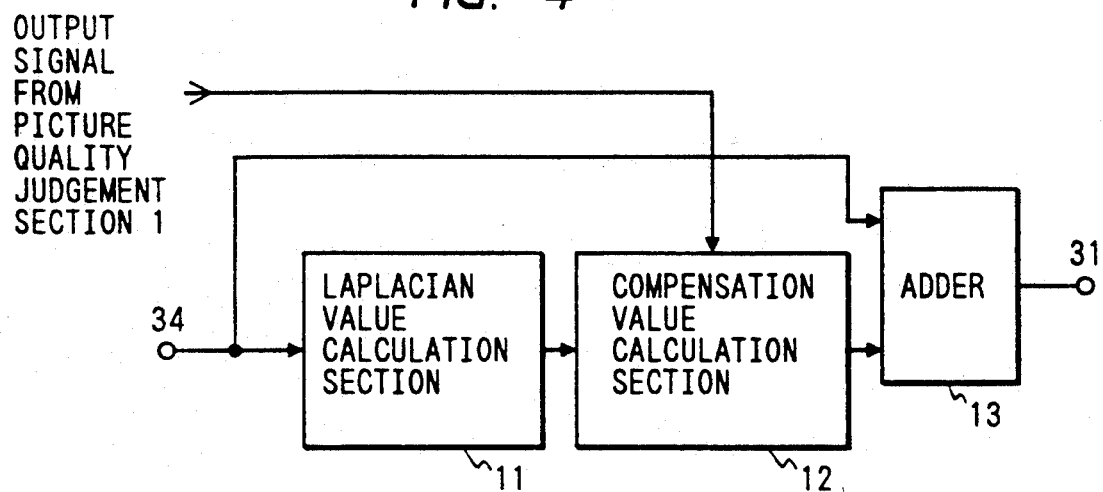
FIG. 4 is a block diagram of a high frequency emphasis section within the encoding noise reduction filter of FIG. 1.
FIG. 5 is a diagram for assistance in describing a high frequency emphasis calculation operation.

The internal configuration of the high frequency emphasis section 3 of FIG. 1 will be described referring first to the block diagram of FIG. 4. In FIG. 4, a Laplacian value calculation section 11 receives the output signal from the coring processing section 2 via an input terminal 34, and a resultant output signal is inputted to a compensation value calculation section 12, whose operation is controlled by the aforementioned control signal produced from the picture quality judgement section 1. An output signal produced from the compensation value calculation section 12 is added to the input signal from input terminal 34, in an adder 13. The operation is as follows. The Laplacian value calculation section 11 calculates, for each of the picture element values of the output signal from the coring processing section 2, a corresponding Laplacian value as mentioned hereinabove. The compensation value calculation section 12 calculates, for each Laplacian value that is thus produced from the Laplacian value calculation section 11, a corresponding compensation value. The calculation of the compensation value is varied in accordance with the state of the control signal from the picture quality judgement section 1. A corresponding output value for that picture element is then obtained, by adding (in the adder 13) the compensation value thus obtained to the original value for that picture element, which is being supplied to the input terminal 34.

The compensation value calculation section 12 can be easily realized in practice as a ROM (read-only memory) which receives as address inputs respective combinations of a control value from the picture quality judgement section 1 and an output value from the Laplacian value calculation section 11, with corresponding compensation values being thereby read out.

The manner of operation of the Laplacian value calculation section 11 shown in FIG. 4 will be described referring to FIG. 5, which illustrates the respective positions of a set of nine successively adjacent picture elements of a frame of the decoded video signal, with the numerical values shown within the squares representing weighting values which are applied to the picture element values, in computing the Laplacian value of an object picture element. The central square, assigned a weighting value of 1, represents the object picture element (i.e. for which a Laplacian value is currently being calculated by the Laplacian value calculation section 11). The two picture elements which are positioned immediately adjacent to the object picture element in the same scanning line each are assigned a weighting value of $-\frac{1}{4}$, and the two picture elements which are positioned immediately adjacent to the object picture element in the next higher and next lower scanning lines also each are assigned the weighting value of $-\frac{1}{4}$. Designating the object picture element as being the $i^{th}$ picture element along the $j^{th}$ scanning line of the frame, the position of the object picture element within the picture will be expressed as $P(i, j)$. Expressing in a similar manner the positions of the aforementioned four picture elements which are immediately adjacent to the object picture element, the Laplacian value for the object picture element is calculated as follows. A Laplacian value is basically a two-dimensional differential value. In the case of a digital picture element value $P(i, j)$, the differential with respect to the i direction and the differential with respect to the j direction can be respectively obtained as difference values, as follows:

$$\Delta_i P(i, j) = P(i, j) - P(i-1, j)$$

$$\Delta_j P(i, j) = P(i, j+1) - P(i, j-1)$$

The 2-dimensional differentials of that picture element value with respect to the i and j directions are thereby obtained as:

$$\Delta_i^2 P(i, j) = \Delta_i P(i+1, j) - \Delta_i P(i, j)$$

$$\Delta_j^2 P(i, j) = \Delta_j P(i, j+1) - \Delta_j P(i, j)$$

The corresponding Laplacian value can be expressed as follows:

$$L(i, j) = \Delta^2 P(i, j)$$
$$= \Delta_i^2 P(i, j) + \Delta_j^2 P(i, j)$$

In the present embodiment, each Laplacian value is obtained based on the respective values of the object picture element $P(i, j)$ and four immediately adjacent elements, as:

$$L(i,j) = \{P(i-1,j) + P(i,j-1) + P(i,j+1) + P(i+1,j)\} - 4P(i,j)$$
$$= -5[P(i,j) - \{P(i-1,j) + P(i,j-1) + P(i,j+1) + P(i+1,j) + P(i,j)\}/5]$$

The Laplacian of the picture element value P(i, j) is thus obtained as a value that is proportional to the difference between the object picture element value P(i, j) and the average of the respective values of four immediately adjacent picture elements.

It will thus be apparent that the Laplacian value calculation section 11 can be readily implemented by a 3-line buffer memory in conjunction with an adder, multiplier, etc., so that a specific description will be omitted.

In the above description it has been assumed that the picture quality judgement section 1 judges the picture quality as being either of two possible levels. However it would be possible to use a greater number of levels (e.g. 3 levels for that judgement function.

Moreover in the embodiment described above, coring processing is executed using only a single threshold value. However, it would be possible to execute the coring processing by using respectively different threshold values for the positive and negative values of the high frequency components of the decoded video signal.

With the present invention as described hereinabove, encoding noise reduction can be executed in accordance with the image quality of a picture represented by the decoded video signal, without the need to execute complex processing. In particular, the invention enables improved picture quality to be obtained when applied to a digital video signal encoding and decoding apparatus which utilizes orthogonal transform processing of inter-frame difference values.

What is claimed is:

1. An encoding noise reduction filter, for application to a decoded video signal produced from a digital video signal encoding and decoding apparatus of a type in which variable values of quantization step size are utilized within each video signal frame during encoding processing, the encoding noise reduction filter comprising:

picture quality judgement means (1) for judging, for each frame of said decoded video signal, a degree of picture quality of said frame based upon an average value of quantization step size used during said encoding processing for said frame;

coring processing means (2) for eliminating high frequency components of said decoded video signal which are below a threshold value that is controlled in accordance with judgement results obtained from said picture quality judgement means, to obtain a coring-processed video signal; and high frequency emphasis means (3) coupled to receive said coring-processed video signal from said coring processing means, for applying a high frequency emphasis to said coring-processed video signal, said high-frequency emphasis being applied in a manner that is controlled based on said judgement results.

2. An encoding noise reduction filter according to claim 1, wherein said high frequency emphasis means comprises:

Laplacian value calculation means (11) for calculating, for each picture element of a frame of said coring-processed video signal, a Laplacian value based upon a value of said each picture element and respective values of a plurality of picture elements which are disposed closely adjacent to said each picture element within said frame;

compensation value calculation means (12) for calculating, for said each picture element, a corresponding compensation value based upon said Laplacian value of said each picture element and a judgement result obtained for a frame containing said picture element, from said picture quality judgement means; and adder means (13) for adding said corresponding compensation value to said each picture element value of the coring-processed video signal.

3. An encoding noise reduction filter according to claim 1, wherein said threshold value of said coring processing means is varied in accordance with a judgment result obtained from said picture quality judgement means.

4. An encoding noise reduction filter according to claim 3, wherein said coring processing means comprises:

a low-pass filter (4) for extracting low-frequency components of said decoded video signal;

subtractor means (5) for subtracting said low-frequency components from said decoded video signal to obtain high frequency components of said video signal;

first selector means (7) for selecting one of a plurality of possible threshold values in accordance with said judgment result, to output a selected threshold value;

absolute value judgement means (6) for deriving absolute values of said high frequency components;

comparator means (8) for comparing said absolute values with said selected threshold value;

second selector means (9) coupled to receive a comparison result from said comparator means as a control input signal, for selecting either said high-frequency components or a fixed value of zero to be outputted therefrom in accordance with said comparison result; and adder means (10) for adding together output values produced from said second selector means and said low-frequency components of the decoded video signal, to obtain said coring-processed video signal.

* * * * *